United States Patent

Toyota

| [11] | Patent Number: | 6,070,486 |
|---|---|---|
| [45] | Date of Patent: | Jun. 6, 2000 |

[54] GEAR TYPE MANUAL TRANSMISSION AND METHOD OF ASSEMBLING THE SAME

[75] Inventor: Hideo Toyota, Hiroshima, Japan

[73] Assignee: Mazda Motor Corporation, Hiroshima, Japan

[21] Appl. No.: 09/010,480

[22] Filed: Jan. 21, 1998

[30] Foreign Application Priority Data

Jan. 22, 1997 [JP] Japan .................................. 9-024292

[51] Int. Cl.[7] ............................. F16H 3/38; B60K 20/00; F16D 13/68
[52] U.S. Cl. ...................... 74/473.19; 74/473.36; 74/339; 192/115
[58] Field of Search ........................... 74/473.36, 473.37, 74/339, 473.19; 192/115, 99 S

[56] References Cited

U.S. PATENT DOCUMENTS

| 4,174,644 | 11/1979 | Nagy et al. ........................... 74/473 R |
| 4,265,137 | 5/1981 | Johannesson et al. . |
| 4,458,550 | 7/1984 | Takahashi ............................. 74/473.36 |
| 5,487,318 | 1/1996 | Schott ................................... 74/473.37 |

FOREIGN PATENT DOCUMENTS 54-138949  10/1979  Japan .

*Primary Examiner*—Thomas R. Hannon
*Assistant Examiner*—Colby M. Hansen
*Attorney, Agent, or Firm*—Sixbey, Friedman, Leedom & Ferguson, P.C.; Donald R. Studebaker

[57] ABSTRACT

A gear type manual transmission equipped with one or more synchronizing mechanisms employing generally U-shaped reverse shift forks consisting of two arms, each of which is pivotally supported at one arm by a first support secured to one of transmission shafts which extends in parallel with one another and is stationary relative to the transmission case and pivotally supported at the other arm by a second support aligned with the first support and secured to the transmission case.

5 Claims, 5 Drawing Sheets

GEAR TYPE MANUAL TRANSMISSION AND METHOD OF ASSEMBLING THE SAME

BACKGROUND OF THE INVENTION

1. Field of the Invention

This invention relates to a gear type manual transmission and a method of assembling the gear type manual transmission.

2. Description of the Related Art

Typically, gear type manual transmissions which are installed to an engine having a crankshaft directed in a longitudinal direction of an engine compartment are equipped with various transmission shafts, including an input shaft, an output shaft and a counter shaft, incorporated in parallel to one another. Such a gear type manual transmission is further equipped with a reverse idler shaft is disposed in parallel to the input and output shafts and a shift mechanism for changing transmission gears range. The shift mechanism incorporates a plurality of synchronizing mechanisms, which are called a synchronizer, to synchronize speeds of gears that are being shifted together. In more detail, such a synchronizer moves ahead of one of the gear unit that is to be meshed, seizes the other of the gear unit and brings the rotational speed of both units together. Once both gears are rotating at the same speed, they may be meshed.

The synchronizer comprises a synchronizer clutch hub with external splines thereon fixedly mounted on a transmission shaft, a front and rear synchronizer rings on both sides of the clutch hub, a gear ring adjacent to each synchronizer ring, and a synchronizer sleeve mounted for axial slide movement on the clutch hub. A shift fork is linked between a shift rod and the synchronizer sleeve to transmit movement of the shift rod to the synchronizer sleeve in the reverse direction, so as to bring gears of a selected gear unit into mesh with each other, thereby select a desired transmission gear with no grinding or shock.

One type of gear shift mechanism for this type of manual transmission comprises a shift arm fixed to a shift rod to transmit movement of the shift rod directly to a gear shift mechanism. Another type of gear shift mechanism has a double armed, reverse shift fork which transmits movement of a shift rod to with an effect of reducing shifting force or shifting distance necessary for the shift rod. The term "reverse shift fork" used in this specification refers to the fact that it transmits movement of the shift rod to a shift mechanism in the reverse direction. In this type of gear shift mechanism, the double armed reverse shift fork is pivotally supported at middle section of both arms by pivot supports, such as pivot pins, which are press-fitted to both side walls of the transmission case, or otherwise secured to a pair of extra support rods extending in parallel from the front end of the transmission case to the rear end as taught in Japanese Unexamined Patent Publication No.54 - 138949.

Typically, when assembling the gear type manual transmission, after having installed shift mechanisms including shift rods and rocker arms or shift forks to a sub-assembly of various transmission shafts, such as an input shaft, a counter shaft, a reverse idler shaft and an output shaft which are essential for the transmission, with gears of each gear unit meshed with each other, the sub-assembly is put as one whole in a transmission case. In the case where a gear type manual transmission employing reverse shift forks in the gear shift mechanism is assembled in that manner, in particular where the reverse shift fork is pivotally supported by pivot pins fitted to both side walls of the transmission case, these pivot pins must be inserted into pivot holes of the reverse shift forks after having put a sub-assembly with the shift rods and the reverse shift forks installed thereto in the transmission case. The reverse shift forks are not always located in correct positions until they are engaged by the pivot pins, it is troublesome, in particular in an automated assembling process, to insert the pivot pins and instal other necessary parts to the transmission.

In the case where the transmission employs a pair of extra support rods for pivotally supporting the reverse shift forks as described in the above mentioned publication No.54-138949, the extra support rods with pivot pins secured thereto are installed to a sub-assembly of transmission shafts and gears, and the reverse shift forks are completely supported by the pivot pins before putting the sub-assembly in the transmission case. While the utilization of extra support rods makes it easy to install the reverse shift forks and has the advantage of automating the process of assembling transmissions, various constraints are imposed on the shift fork support structure. For example, the extra support rod extending from the front of the transmission case to the back needs more space in the interior of the transmission case cram-full of transmission shafts and gears and their associated parts and is too flexible to ensure precise gear shift action.

SUMMARY OF THE INVENTION

It is an objective of this invention to provide a gear type manual transmission with reverse shift forks employed which provides simplified assembling work of the transmission.

It is another object of this invention to provide a gear type manual transmission with reverse shift forks employed which has a reverse shift fork support mechanism with increased support rigidity.

It is still another object of this invention to provide a method of assembling a gear type manual transmission with reverse shift forks employed.

The foregoing objects of the present invention are achieved by providing a gear type manual transmission equipped with one or more gear shift mechanisms, such as a synchronizing mechanism, which employ generally U-shaped reverse shift forks, each reverse shift fork consisting of two arms pivotally supported by a shift fork support mechanism comprising first and second supports such as pivot pins. The first support is secured to a stationary shaft, such as a reverse idler shaft or otherwise an extra shaft, extending in parallel to transmission shafts and fixed to the transmission case and pivotally supports the generally U-shaped reverse shift fork at one of the arms, and the second support aligned with the first support in a direction spatially perpendicular to axes of rotation of the transmission shafts and secured to the transmission case and pivotally supports the generally U-shaped reverse shift fork at another of the arms.

The stationary shaft by which the reverse shift fork is supported may be a reverse idler shaft for supporting an reverse idler gear disposed between a reverse gear and a driving reverse idler gear, or otherwise an extra stationary shaft fixedly disposed in the transmission case. The gear shift mechanism such as a synchronizing mechanism is installed to a counter shaft of the gear type manual transmission.

The gear type manual transmission is assembled through the steps of providing a transmission shaft assembly by assembling the transmission shafts including at least a reverse idler shaft, an input shaft, and a counter shaft as one whole with gears of each transmission gear set meshed with each other, pivotally supporting the generally U-shaped shift fork at one of the arms by the first support secured to the reverse idler shaft, putting and supporting the transmission shaft assembly in the transmission case, and pivotally supporting the generally U-shaped shift fork at the other arm by the second support secured to the transmission case.

The gear type manual transmission according to the invention permits the reverse shift fork to be supported at one side by the first support installed to the transmission shaft assembly before putting the transmission shaft assembly in the transmission case. The shift fork support mechanism precisely positions the reverse shift fork relative to the transmission shaft assembly at three points, namely the fulcrum point at the first support on the fixed transmission shaft, the action point at the junction to the shift rod and the reaction point at the junction to the gear shift mechanism, which always positions the reverse shift fork precisely relative to the second support secured to the transmission case when the transmission shaft assembly is put in the transmission case. As a result, the assembling work of the reverse shift fork in the gear type manual transmission is made simple and easy, which leads to an automated process of assembling the gear type manual transmission.

The reverse shift fork is supported by two separate parts, namely the stationary shaft and the transmission case, which is always advantageous to the shift fork support mechanism in view of structural rigidity and increases the degree of layout freedom of the shift fork support mechanism as compared with the prior art gear type manual transmission which employs a pair of extra support rods for supporting a U-shaped reverse shift fork in the shift fork support mechanism.

The utilization of the reverse idler shaft for supporting the reverse shift fork thereon reduces the number of parts used in the shift fork support mechanism. Supporting a plurality of the reverse shift forks on the stationary shaft provides the same lever ratio for all the reverse shift forks with an effect of providing uniform gear shift feelings.

In the process of assembling the gear type manual transmission of the invention equipped with the reverse shift fork consisting of two arms in a form of generally U-shape to be pivotally supported by the first and second pivot supports in alignment with each other, the one being secured to the reverse idler shaft arranged in parallel to the input, output and counter shafts and the second one being secured to the transmission case, after having provided a transmission shaft assembly by assembling the transmission shafts including at least the reverse idler shaft, the input shaft, and the counter shaft as one whole with gears of each transmission gear set meshed with each other, the generally U-shaped reverse shift fork at one of the arms is pivotally supporting by the first support secured to the reverse idler shaft of the transmission shaft assembly. Thereafter, the transmission shaft assembly is put and supported in the transmission case, then, the generally U-shaped shift fork is pivotally supporting at the other arm by the second support secured to the transmission case. Pivotally supporting the reverse shift fork by the second support makes it easy and precise to finally install the reverse shift fork to the gear type manual transmission.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
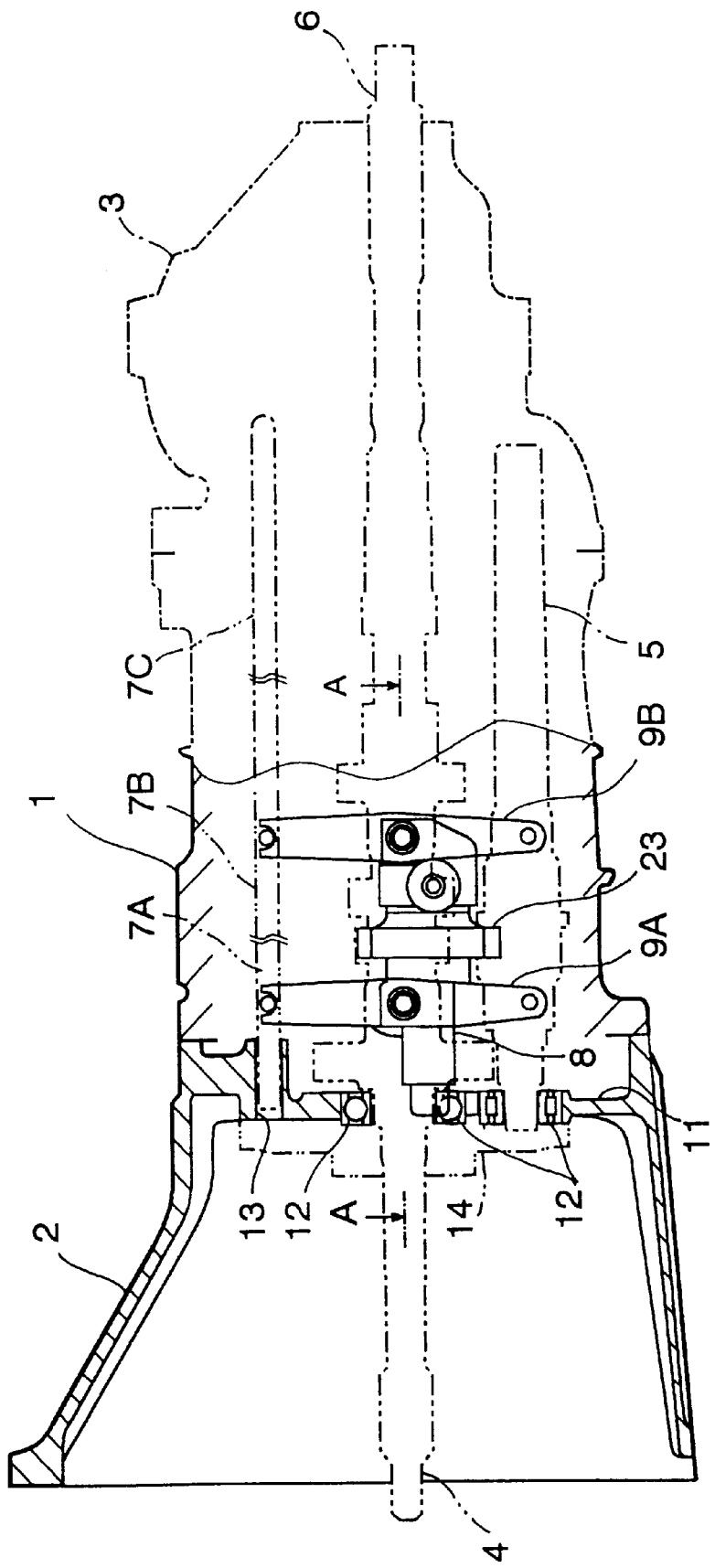
FIG. 1 is a longitudinal cross-sectional view partly showing a gear type manual transmission in accordance with an embodiment of the invention.

Referring to the drawings in detail, in particular, to FIG. 1, a gear type manual transmission (which is hereafter referred to as a transmission for simplicity) in accordance with an embodiment of the invention is shown as being incorporated in, for example, an FR (front engine-rear drive) type of vehicle which is equipped with an engine having a crankshaft directed in a longitudinal direction of the vehicle. This transmission has, for example, five forward gears and a reverse gear and, when ready for fourth gear, brings the input and output shafts into direct coupling to each other.

Figure 3:
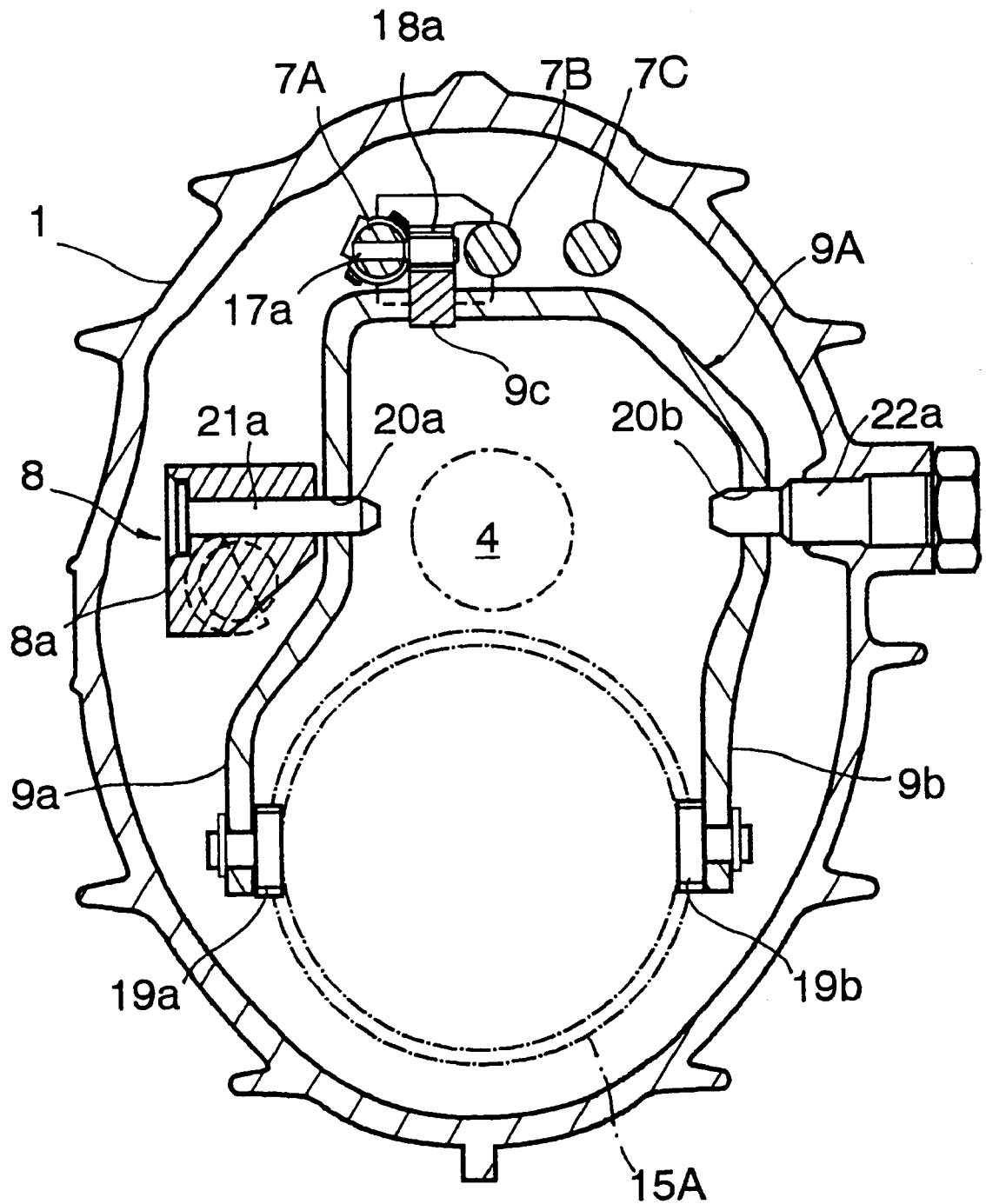
FIG. 3 is a transverse cross-sectional view showing the gear type manual transmission taken along line B—B of FIG. 2.
Figure 4:
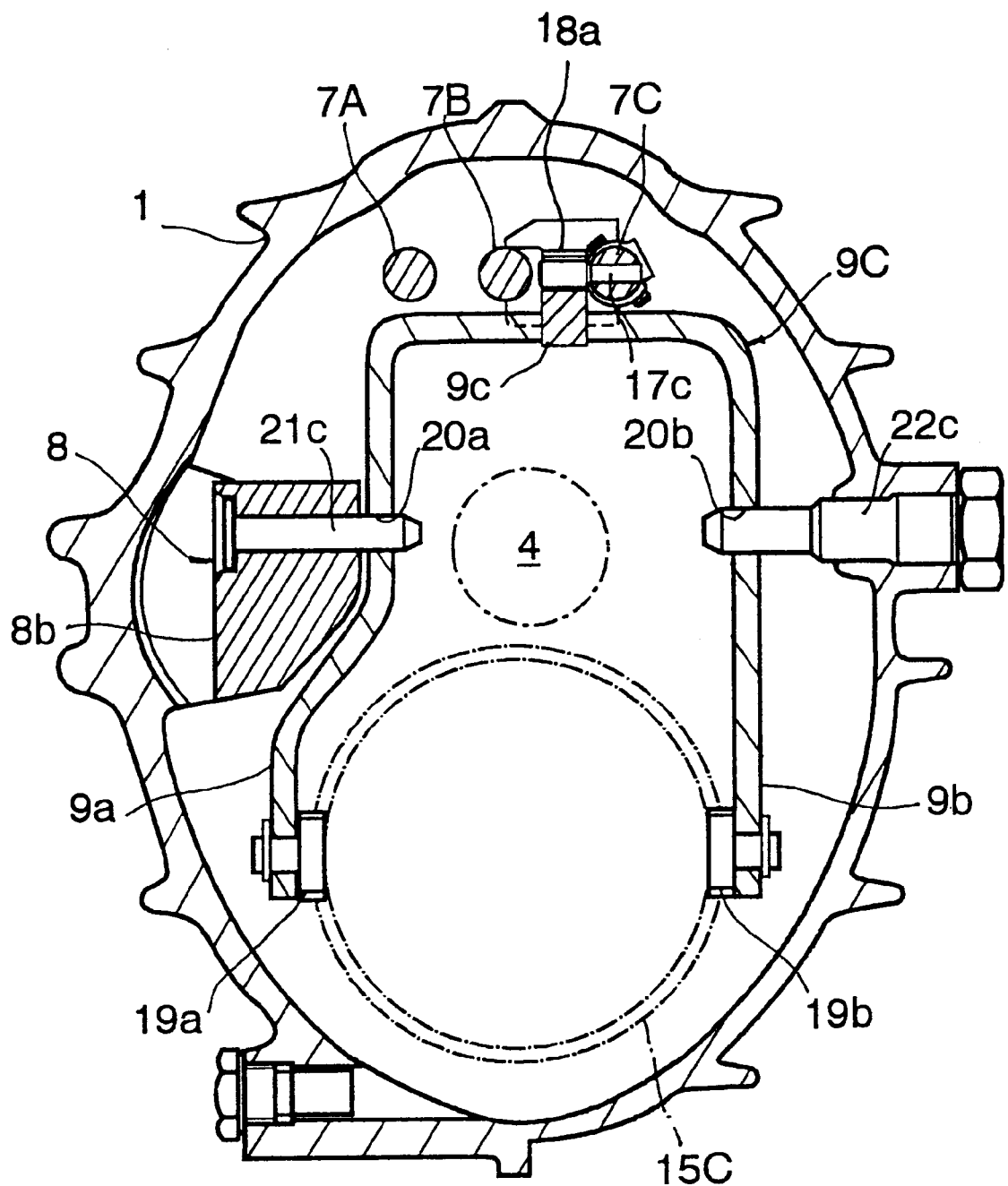
FIG. 4 is a transverse cross-sectional view showing the gear type manual transmission taken along line C—C of FIG. 2.

The transmission is encased in a transmission case comprising a transmission case 1, a clutch housing 2 connected to the front end of the transmission case 1 and an extension housing 3 connected to the rear end of the transmission case 1. An input shaft 4 and an output shaft 6 are disposed coaxially and extend through the entire transmission case from its front end to its rear end. A counter shaft 5 is disposed in parallel to the input and output shafts 4 and 6 and supported in the transmission case 1. A reverse idler shaft 8 on which a reverse idle gear 23 is mounted; and is disposed in parallel to these input, output and counter shafts 4, 5 and 6 and supported in the transmission case 1. A plurality of shift rods 7A–7C arranged side by side (as shown in FIGS. 3 and 4) in a horizontal plane (which is perpendicular to the surface of the drawing) are supported for slide movement in the transmission case 1. As will be described later, each shift rod 7 is in engagement with a reverse shift fork 9.

The input shaft 4 at its input end (the left side end as viewed in FIG. 1) is connected to an engine output shaft (not shown) by means of an engine clutch (not shown). The output shaft 5 at its output end (the right side end as viewed in FIG. 1) is connected to a propeller shaft (not shown). The clutch housing 2 at its rear end is formed with a rear wall 11. The rear wall 11 receives bearings 12 by means of which the input shaft 4 at its middle portion and the counter shaft 5 at its front end portion are supported, respectively, for rotation. The rear wall 11 further supports front ends of the shift rods 7A–7C for axial slide movement in guide bores 13 formed therein and fixedly holds the reverse idle shaft 8 at its front end. A front cap 14 is attached to the rear wall 11 to cover these front ends of the shafts 5 and 8 and rods 7A–7C.

The transmission six gear sets for five forward gears and one reverse gear, each gear set comprising two gears, one on the input shaft 4 and one on the counter shaft 5, capable of being brought into mesh with each other and unmesh from each other. These gears are selectively brought into mesh with each other by means of a shift mechanism to connect and disconnect rotation of the input shaft 4 to the output shaft 6, through the counter shaft 5 or directly. The shift mechanism incorporates a plurality of synchronizing mechanisms in order for the transmission to provide synchromesh. Each synchronizing mechanism comprises a synchronizer clutch hub with external splines thereon fixedly mounted on a transmission shaft, a front and rear synchronizer rings on both sides of the clutch hub, a gear ring adjacent to each synchronizer ring, and a synchronizer sleeve mounted for axial slide movement on the clutch hub. A reverse shift fork is linked between the shift rod and the synchronizer sleeve to transmit movement of the shift rod to the synchronizer sleeve in the reverse direction, so as to bring gears of a selected transmission gear into mesh with each other, thereby providing a desired transmission gear with no grinding or shock. Various types of synchronizing mechanisms are well known in the art and any well known type of synchronizing mechanism may be employed in the transmission.

Three synchronizing mechanisms may be incorporated to change gears between first and second gears, third and fourth gears and fifth and reverse gears, respectively. The 1-2 and 5-R synchronizing mechanisms are incorporated to the counter shaft 5, and the 3-4 synchronizing mechanism is however incorporated to the input shaft 4. The gear shift mechanism incorporating the 5-R synchronizing mechanism includes the shift rod 7A and the reverse shift fork 9A and the 5-R synchronizing mechanism has a synchronizing sleeve 15A as shown in FIG. 3. Similarly, the shift mechanism incorporating the 1-2 synchronizing mechanism includes the shift rod 7C and the reverse shift fork 9C and the 1-2 synchronizing mechanism has a synchronizing sleeve 15C as shown in FIG. 4. These reverse shift forks 9A–9C may be of a type of rocker arm.

Describing the 5-R synchronizing mechanism by way of example, the reverse shift fork 9A has a generally U-shaped rocker arm comprising arms 9a and 9b and an arm head 9c as shown in FIG. 3. The arms 9a and 9b are provided at their distal ends with engaging pads 19a and 19b, respectively (see FIGS. 2 and 3), and formed at their middle sections with pivot holes 20a and 20b, respectively. The arm head 9c is formed with a groove 18a in which a link pin 17a extending from the shift rod 7A is received. The reverse shift fork 9A is supported by means of pivot pins 21a and 22a in alignment with each other and fitted into the pivot holes 20a and 20b of the arms 9a and 9b, respectively, from the opposite sides and is coupled to the sleeve 15A of the 5-R synchronizing mechanism by means of the engaging pads 19a and 19b of the arms 9a and 9b, respectively, from the opposite sides. The pivot pin 21a is held by the reverse idler shaft 8, and the pivot pin 22a is held by means of the transmission case 1.

Figure 2:
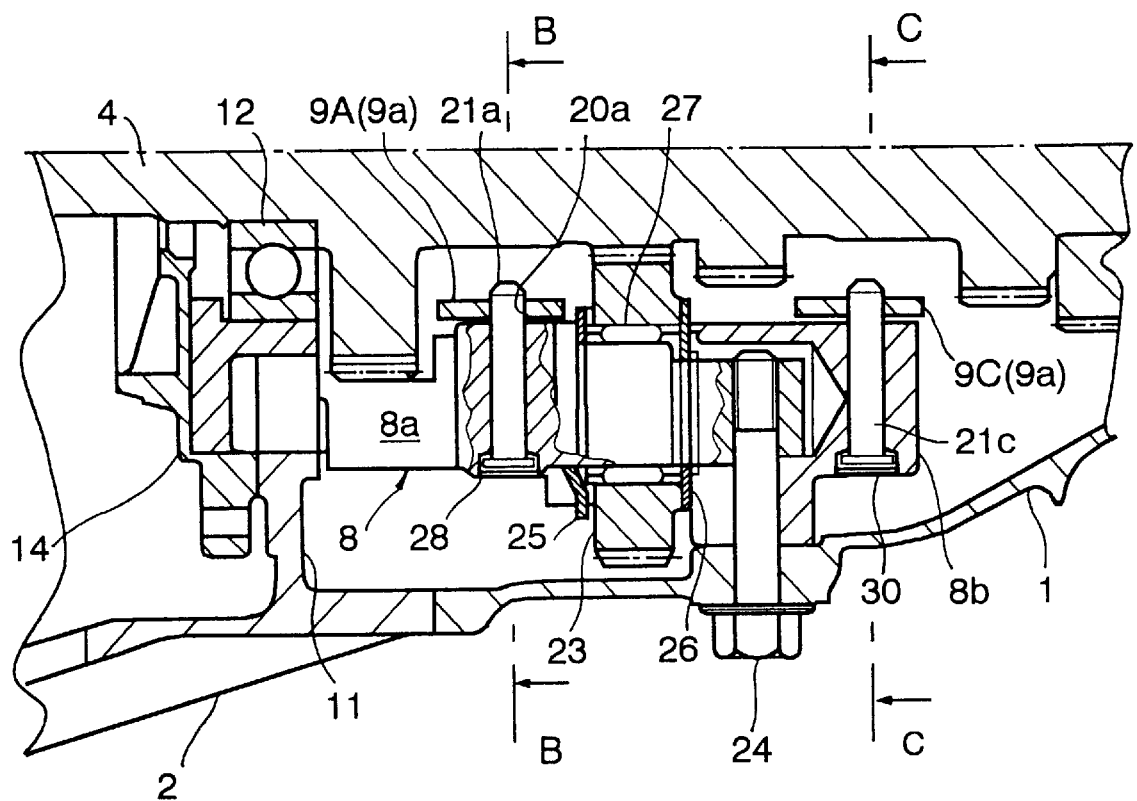
FIG. 2 is a longitudinal cross sectional view of the gear type manual transmission taken along line A—A of FIG. 1, which shows details of a quarter section of the gear type manual transmission.

As shown in FIG. 2 which is a longitudinal cross-sectional view of part of the transmission shown in FIG. 1, the reverse idler shaft 8 comprises a rod 8a (also shown in FIG. 3) and a rod end support 8b formed with a cavity in which the rod 8a at its rear end is received. The rod 8a at its front end is fixedly supported by the rear wall 11 of the clutch housing 2. The rod end support 8b is secured to the transmission case 1 by means of a fastening bolt 24. As clearly seen in FIG. 2, the fastening bolt 24 fastens the rod 8a received in the cavity of the rod end support 8b. A reverse idler gear 23 is mounted for rotation on the reverse idler shaft 8 by means of a needle bearing 27 and interposed between spacer rings 25 and 26. The spacer ring 26 is axially forced against the reverse idler gear 23 from the rear side by the rod end support 8b so as to prevent the reverse idler gear 23 from axial movement. The pivot pin 21a is fixedly fitted to the rod 8a on the forward side of the reverse idler gear 23 by means of a retainer ring 28. A pivot pin 21c, by which the reverse shift fork 9C of the 1-2 synchronizing mechanism (which will be described in detail later) is supported from one side, is fixedly fitted to the rod end support 8b by means of a retainer ring 30.

The pivot pins 21a and 22a form two pivot halves of which a pivot shaft serving as a fulcrum for the rocker arm of the reverse shift fork 9A of the 5-R synchronizing mechanism is made up. The reverse shift fork 9A is turned about the pivot pins 21a and 22a to shift the sleeve 15A of the 5-R synchronizing mechanism in an axial direction opposite to the direction of axial movement of the shift rod 7A. As we described and shown in FIGS. 2–4, the input shaft 4 is supported by the bearing 12 received in the rear wall 11 of the clutch housing 2 to which the front cap 14 is attached.

Similarly, the reverse shift fork 9C of the 1-2 synchronizing mechanism has a generally U-shaped rocker arm comprising arms 9a and 9b and an arm head 9c as shown in FIG. 4. The arms 9a and 9b are provided at their distal ends with engaging pads 19a and 19b, respectively, and formed at their middle sections with pivot holes 20a and 20b, respectively. The arm head 9c is formed with a groove 18c in which a link pin 17c extending from the shift rod 7C is received. The reverse shift fork 9C is supported by means of pivot pins 21c and 22c in alignment with each other and fitted into the pivot holes 20a and 20b of the arms 9a and 9b, respectively, from the opposite sides and is coupled to the sleeve 15C of the 1-2 synchronizing mechanism by means of the engaging pads 19a and 19b of the arms 9a and 9b, respectively, from the opposite sides. The pivot pin 21c is held by the rod end support 8b of the reverse idler shaft 8, and the pivot pin 22c is held by means of the transmission case 1.

The pivot pins 21c and 22c form two pivot halves of which a pivot shaft serving as a fulcrum for the rocker arm of the reverse shift fork 9C of the 1-2 synchronizing mechanism is made up. The reverse shift fork 9C is turned about the pivot pins 21c and 22c to shift the sleeve 15C of the 1-2 synchronizing mechanism in an axial direction opposite to the direction of axial movement of the shift rod 7C.

Figure 5:
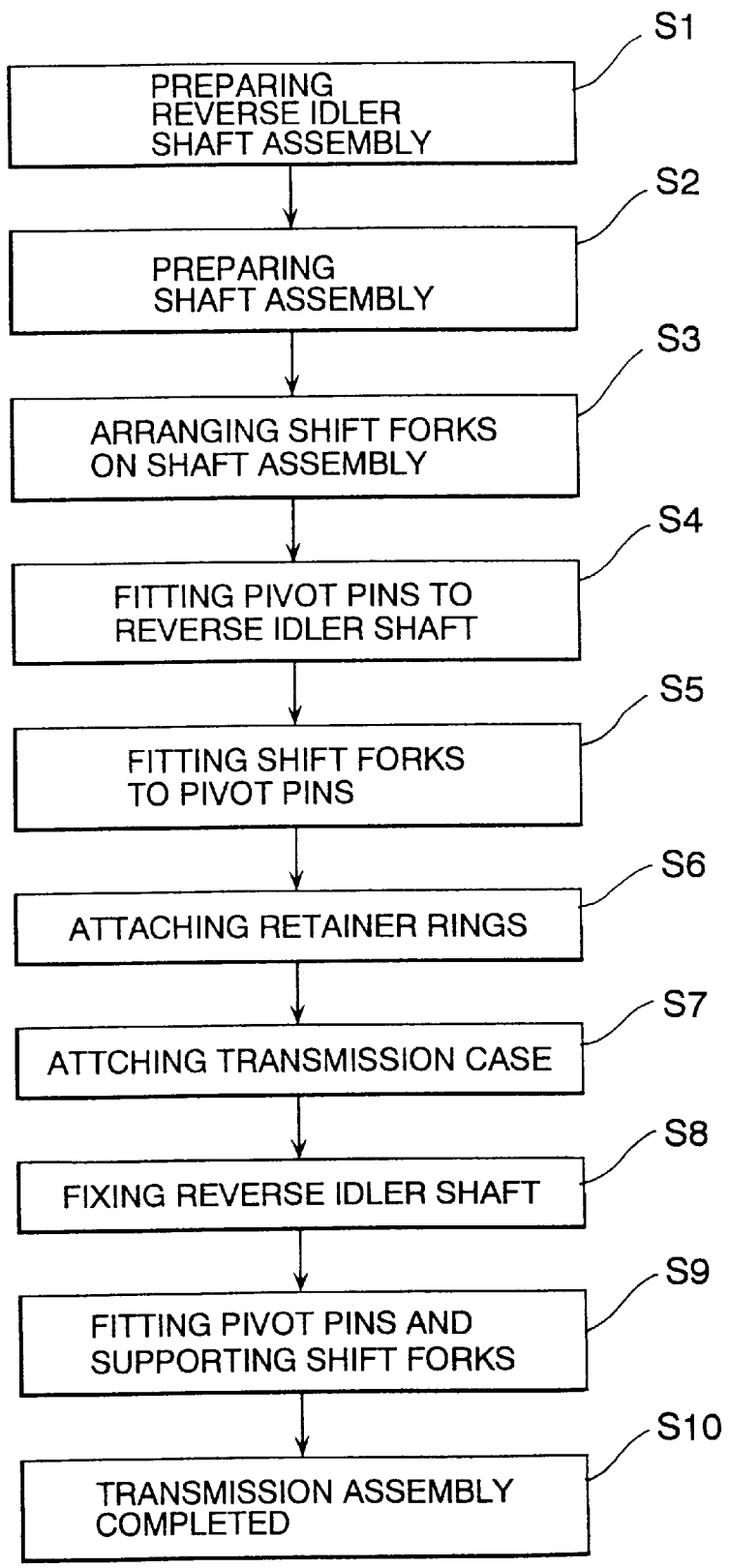
FIG. 5 is a flow chart illustrating the steps of assembling the gear type manual transmission shown in FIG. 1.

FIG. 5 is a flow chart illustrating sequential steps of assembling the gear type maanual transmission according to the invention.

As shown in FIG. 5, a reverse idler shaft assembly is prepared by fitting the spacer ring 25, the reverse idler gear 23, the needle bearing 27 and the spacer ring 26 to the rod 8a of the reverse idler shaft 8 in this order. A transmission shaft assemblie is subsequently prepared (step S1). Separately from the reverse idler shaft assembly, input and counter shaft with transmission gears are prepared. These input, counter and reverse idler shafts are assembled as a transmission shaft assembly and attached to the clutch housing 2 by fitting their front ends into bearings 12 held by the rear wall 11 of the clutch housing 2, respectively (step S2). After having brought gears of each gear set in mesh with each other and installed the shift rods 7A and 7C by inserting their front ends into the guide holes 13 of the rear wall 11 of the clutch housing 2, respectively, the reverse shift forks 9A and 9C are arranged in relative positions to the transmission shaft assemblies (step S3), and the rod end support 8b is subsequently fitted to the rod 8a of the reverse idler shaft 8 (step S4). The pivot pin 21a is fitted to the rod 8a of the reverse idler shaft 8 so as to enter the pivot hole 20a of the arm 9a of the reverse shift fork 9A of the 5-R synchronizing mechanism, and the pivot pin 21c is fitted to the rod end support 8b of the reverse idler shaft 8 so as to enter the pivot hole 20a of the arm 9a of the reverse shift fork 9C of the 1-2 synchronizing mechanism (step S5). After adjustment, the pivot pins 21a and 21c are fixed to these rod 8a and rod end support 8b of the reverse idler shaft 8 by means of the retainer rings 28 and 30, respectively (step S6). After having fixedly attached the transmission case 1 to the clutch housing 2 to enclose the transmission shaft assemblies therein (step S7), the fastening bolt 24 is fastened to fix the reverse idler shaft 8 to the transmission case 1 (step S8). Subsequently, the pivot pin 22a is fixed to the transmission case 1 so as to enter the pivot hole 20b of the arm 9b of the reverse shift fork 9A of the 5-R synchronizing mechanism, and similarly, the pivot pin 22c is fixed to the transmission case 1 and engaged in the pivot hole 20b of the arm 9b of the reverse shift fork 9A of the 1-2 synchronizing mechanism (step S9). In this way, the gear type manual transmission is completely assembled (step S10).

Although a reverse shift fork of the 3-4 synchronizing mechanism is not shown in figures, a pivot shaft serving as a fulcrum for a generally U-shaped rocker arm of the reverse shift fork is made up of pivot pins forming two mating pivot halves. These pivot pins are fixed to the transmission case 1 so as to enter the pivot holes of the arms of the reverse shift fork of the 5-R synchronizing mechanism, thereby supporting the reverse shift fork for pivotal movement. The reverse shift fork is arranged in relative position to the transmission shaft assemblies as well as the reverse shift forks 9A and 9C (step S3), and the pivot pins are fixed to the transmission case 1 from the opposite sides to support the reverse shift fork of the 3-4 synchronizing mechanism (step S9).

In assembling the transmission of the invention, the U-shaped reverse shift fork is related to the fixed transmission shaft, i.e. the reverse idler shaft in the preceding embodiment, attached to the clutch housing 2 and precisely positioned at three points, namely the fulcrum point on the fixed transmission shaft, the action point at the shift rod and the reaction point at the gear shift mechanism, then it is supported at one of its two arms by the pivot pin 21 secured to the fixed transmission shaft before attaching the transmission case 1 to the clutch housing 2. After having attached the transmission case 1 to the clutch housing 2, the U-shaped reverse shift fork at another of its two arms is supported by the pivot pin 22 secured to the transmission case 1. This separated shift fork supporting structure realizes simplified shift fork assembling work. In addition, the separated pivotal supports of the reverse shift fork, one on the fixed transmission shaft essential for the transmission which has a high rigidity and one on the transmission housing, provides an increased supporting strength for the reverse shift fork.

The stationary shaft, to which the U-shaped reverse shift fork at one of its two arms is attached and supported through a pivot pin before attaching the transmission case 1 to the clutch housing 2, may be any stationary shaft essential for the transmission other than the reverse idler shaft, or otherwise an extra stationary shaft disposed in the transmission case.

Although, in the preceding embodiment, the transmission has been described as being installed to an FR type of vehicle which is equipped with an engine having a crankshaft directed in a longitudinal direction of the vehicle, it may be installed to any type of vehicle.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A gear type manual transmission equipped with a generally U-shaped shift fork, comprising two arms, which is pivotally supported by a shift fork support mechanism so as to turn around a pivotal axis to transmit movement of a shift rod to a gear shift mechanism in the reverse direction, said shift fork support mechanism comprising:

a transmission case in which a transmission gear assembly including a plurality of parallel rotary shafts is installed;

a stationary shaft disposed in parallel with said rotary shaft in said transmission case;

a first supported secured to said stationary shafts and pivotally supporting the generally U-shaped shift fork at one of the arms; and a second support secured to said transmission case and pivotally supporting the generally U-shaped shift fork at another of the arms;

said first support and said second support being in coaxially alignment with each other in a direction perpendicular to axes of rotation of said rotary shafts.

2. A shift fork support mechanism as defined in claim 1, wherein said stationary shaft is a reverse idler shaft fixedly secured to said transmission case by which an reverse idler gear disposed between reverse gear and a driving reverse idler gear is supported for rotation.

3. A shift fork support mechanism as defined in claim 1, wherein the gear type manual transmission has a plurality of said gear shift mechanisms, said generally U-shaped shift fork of each of at least two of said gear shift mechanisms being pivotally supported by said first support secured to said stationary shaft.

4. A shift fork support mechanism as defined in claim 1, wherein said gear shift mechanism comprises a synchronizing mechanism installed to a counter shaft of the gear type manual transmission and linked to said generally U-shaped shift fork.

5. A method of assembling a gear type manual transmission which has a shift fork support mechanism for supporting a generally U-shaped shift fork comprising two arms in a gear type manual transmission, said generally U-shaped shift fork being pivotally supported at one of said arms by a first support secured to a reverse idler shaft in parallel to input, output and counter shafts of the transmission and supported at another one of said arms by a second support secured to a transmission case so as to turn about an axis in which said first and second supports are aligned with each other, thereby causing an axial movement of a gear shift mechanism opposite in direction to movement of a shift rod, said method comprising the steps of:

providing a shaft assembly by assembling said reverse idler shaft, said input shaft, and said counter shaft as one unit with gears of each gear set meshed with each other;

pivotally supporting said generally U-shaped shift fork by said first support secured to said reverse idler shaft;

encasing and supporting said shaft assembly in said transmission case; and pivotally supporting said generally U-shaped shift fork by said second support secured to said transmission case.

* * * * *